United States Patent [19]

Borrett et al.

[11] Patent Number: 4,652,965
[45] Date of Patent: Mar. 24, 1987

[54] HIGH LEVEL MAGNETIC TRIP CIRCUIT

[75] Inventors: Ronald D. Borrett, Marion; Henry J. Zylstra, Alburnette, both of Iowa

[73] Assignee: Square D Company, Palatine, Ill.

[21] Appl. No.: 725,066

[22] Filed: Apr. 19, 1985

[51] Int. Cl.4 .............................................. H02H 3/08
[52] U.S. Cl. ....................................... 361/94; 361/95; 361/111
[58] Field of Search ........................ 361/89, 93, 94, 95, 361/96, 97

[56] References Cited

U.S. PATENT DOCUMENTS

| | | | |
|---|---|---|---|
| 3,475,061 | 10/1969 | Steinkamp et al. | 361/89 |
| 3,924,160 | 12/1975 | Maier et al. | 361/94 |
| 4,004,201 | 1/1977 | Du Puy | 361/96 |
| 4,368,499 | 1/1983 | Stifter | 361/89 |
| 4,443,828 | 4/1984 | Legrand et al. | 361/93 |

Primary Examiner—A. D. Pellinen
Assistant Examiner—Jeffrey A. Gaffin
Attorney, Agent, or Firm—Mary R. Jankousky; Richard T. Guttman

[57] ABSTRACT

An electrical circuit to signal a circuit breaker to trip when the circuit breaker is closed and a high level fault occurs or when a low level fault occurs while the breaker is in the process of closing. A mechanical switch tied to the breaker contacts deactivates the low level trip function when the contacts are closed. A high level overcurrent causes a trigger diode to conduct current, energizing an opto-coupler that causes the trip solenoid to trip the breaker. The circuit also causes the breaker to trip if a sustained medium level overcurrent exists.

8 Claims, 2 Drawing Figures

HIGH LEVEL MAGNETIC TRIP CIRCUIT

FIELD OF THE INVENTION

This invention relates to the field of detection of overcurrents with circuit breakers, and in particular to a circuit which signals the breaker to trip upon the occurrence of several different types of overcurrents.

DESCRIPTION OF PRIOR ART

In the prior art, circuit breakers provide for a variety of trip functions, including an instantaneous trip, a short time delay trip at a given overcurrent level and a long time delay trip at a lower overcurrent level. These trip functions are associated with an electronic trip unit, a solenoid and latch system controlling the operation of an overcenter spring mechanism. The latch system, such as one described in U.S. Pat. No. 4,491,709 entitled "Motor and Blade Control for High Amperage Molded Case Circuit Breakers", issued to F. E. Chabot, et al. on Jan. 1, 1985, assigned to the same assignee as the present invention and herein incorporated by reference, includes a main latch and a secondary latch. The mechanical operation of the two latches opens the circuit breaker contacts to prevent damage to the equipment load during the occurrence of one of the above mentioned types of faults. However, should a fault occur that is of a higher level than any of the above mentioned faults, the breaker mechanism may be damaged before the latch system can open the breaker contacts. To meet the demands of this higher maximum current level, a second trip unit is necessary.

The second trip unit or high magnetic trip unit, will provide additional trip functions to protect the breaker during close and latch operations and to provide thermal protection. Because the maximum current level must be interrupted very quickly, the high magnetic trip unit must operate using only one latch. The use of one latch also eliminates the problems with a secondary latch having insufficient strength to handle the increased forces associated with the main latch at very high fault levels.

SUMMARY OF THE INVENTION

It is an object of this invention to provide a circuit affording fast accurate high level magnetic protection for an electric circuit breaker.

It is a further object of this invention to provide a circuit which will signal the breaker to trip during the closing of the circuit breaker at a level lower than the breaker high magnetic trip level.

It is a further object of this invention to provide a thermal protection trip after a predetermined delay at a lower fault level than the high level trip.

These objects are achieved by the magnetic trip system of the present invention which preferably has a high level instantaneous trip function, a low level instantaneous trip function, and a time delay trip function. The portion of the circuit performing each function is connected to an opto-coupler that energizes the high magnetic trip solenoid upon the occurrence of an appropriate level fault. A current transformer supplies for each trip function a signal proportional to the breaker current. The high level instantaneous portion of the trip circuit derives the signal from the current transformer via a voltage divider, and activates the opto-coupler when a trigger diode is turned on. The low level instantaneous portion of the circuit picks up the current transformer signal through a second voltage divider and energizes the opto-coupler when the breakdown voltage of a zener diode is exceeded. When the breaker contacts are closed the low level instantaneous function is disabled by a switch connected to the contacts. The current transformer signal also charges a capacitor in the time delay portion of the circuit. The gate and anode of a programmable unijunction transistor are held constant. As the current through the breaker increases, the current transformer signal charges up the capacitor, until the capacitor voltage feeding the programmable unijunction transistor anode exceeds the gate voltage and the programmable unijunction transistor conducts to energize the opto-coupler.

DESCRIPTION OF THE PREFERRED EMBODIMENT

Figures 1, 2:
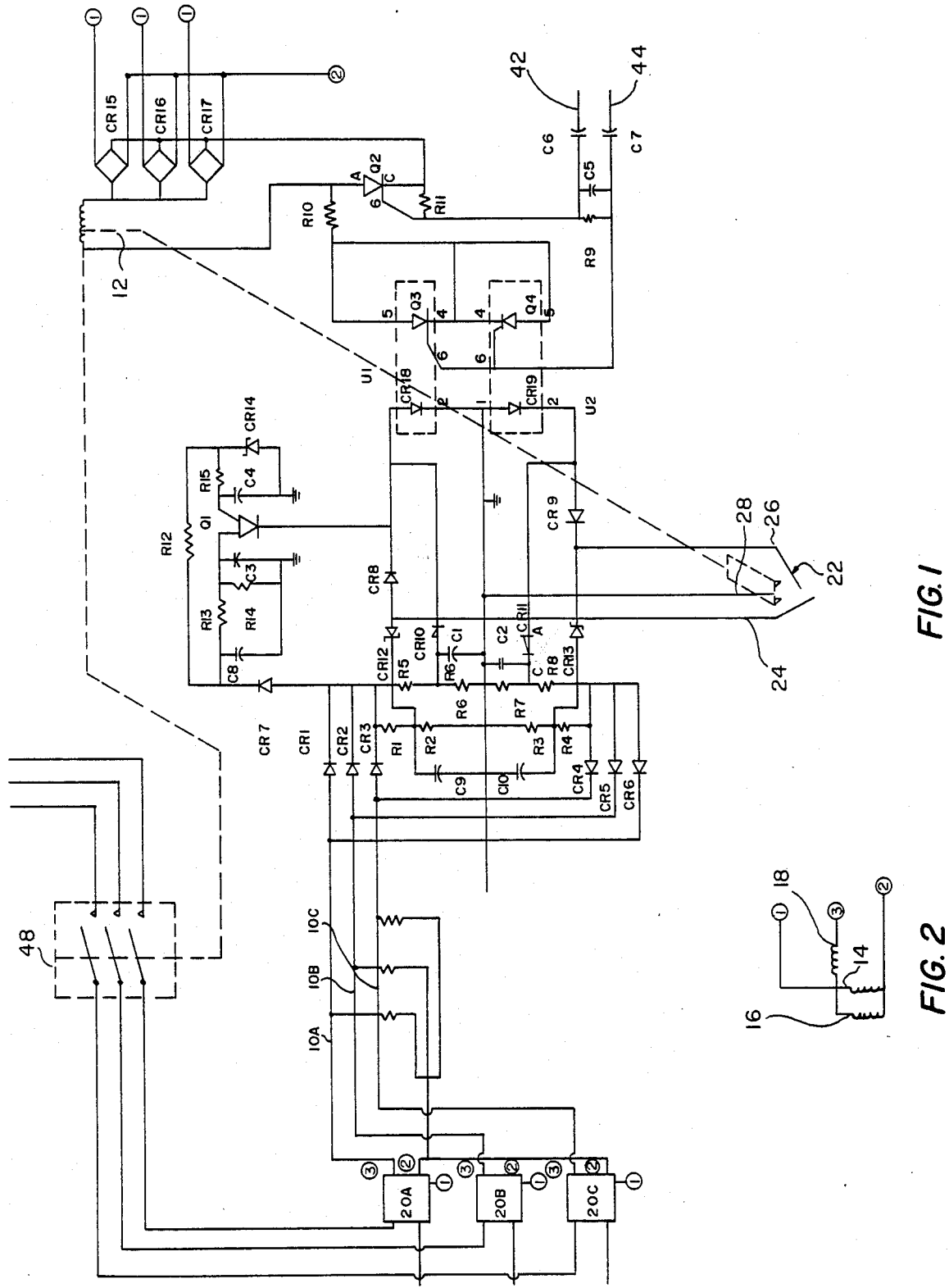
FIG. 1 is a schematic circuit diagram of the preferred embodiment of the subject invention.
FIG. 2 is a schematic diagram of the connections of the current transformer coils of one pole of a circuit breaker.

The electrical circuit that is the preferred embodiment of the subject invention, as shown in FIG. 1, monitors the voltage across the phase conductors 10A, 10B and 10C and energizes a high magnetic trip solenoid to provide a number of circuit breaker trip functions: (1) high level instantaneous trip to provide mechanical protection for the breaker mechanism during a maximum current fault, (2) low level instantaneous trip to protect the breaker contacts during a close and latch operation, and (3) time delay trip to provide thermal protection for the breaker.

Other trip functions are provided by the main trip unit which includes a solenoid and sensing means separate from the components discussed herein. The main trip unit trips the circuit breaker upon the occurrence of a fault (1) after a short time delay to provide mechanical protection, (2) after a long time delay to provide thermal protection to the distribution cable, and (3) instantaneously. For certain fault levels the trip functions of the main trip unit and high magnetic trip unit overlap, causing both the high magnetic trip circuit and the main trip unit to energize their respective trip solenoids. When the main trip unit energizes the main solenoid, it also sends a pulse signal via leads 42 and 44 to the gate and cathode of SCRs Q3 and Q4. These SCRs turn on and energize the trip solenoid 12, as will be described later.

The main trip unit functions are to protect the customer's load equipment and the trip levels are adjustable by the customer over a range of overcurrent values. The purpose of the high magnetic trip unit is to protect the circuit breaker itself, so the associated trip levels are not adjustable. The main trip unit requires a relatively small amount of current since it operates a secondary latch that in turn operates a main latch. The high level instantaneous trip function protection provided by the trip circuit described herein requires a faster trip time than that available with the main trip unit. A high magnetic trip unit is supplied to operate at a higher current level proportional to the fault level. The high current enables the high magnetic trip unit to operate a high magnetic solenoid that works directly on the main latch. This application concerns only the high magnetic trip circuit.

All three tripping functions performed by the high magnetic trip circuit are activated by a signal derived from resistors R12, R13 and R14 connected across the current transformers 20A, 20B and 20C of the phase conductors 10A, 10B and 10C, respectively. The current transformers are of the three coil type described in Ser. No. (DEC-51), entitled "High Saturation Three Coil Current Transformer" filed simultaneously herewith by H. Zylstra, assigned to the same assignee as the instant invention, and herein incorporated by reference. The preferred embodiment of the current transformer has two coils 14 and 16 electrically connected in parallel, with the combination connected in series with a coil 18 as shown in FIG. 2. The center connection between the parallel combination and coil 18 is labelled connection 1, while the second end of coil 18 is connected to connection 3. The second end of the parallel combination of coils 14 and 16 is connected to connection 2.

One end of resistor R12 is connected concurrently to the anode of diode CR1, the cathode of diode CR6 and to connection 3 of the current transformer for the phase conductor 10A. The second end of resistor R12 is connected to connection 2 of the current transformer. Resistors R13 and R14 are likewise respectively connected concurrently at one end to the anode of a diode CR2 or CR3, the cathode of a diode CR5 or CR4 and connection 3 of phase conductors 10B or 10C, while the other end of resistors R13 and R14 are connected to connection 2. The concurrent connection of the current transformers to diodes of opposing polarity allows the circuit to measure both positive and negative overcurrents.

The cathode of positive bias diodes CR1, CR2 and CR3 are connected concurrently to each other, resistors R1 and R5, and to the anode of diode CR7. The second side of resistor R1 is connected concurrently to capacitor C9, resistor R2, and the cathode of zener diode CR12. The second sides of capacitor C9 and resistor R2 are connected to ground. The anode of zener diode CR12 is connected to the anode of diode CR8, the cathode of which is connected concurrently to the anode of the light emitting diode CR18 of the opto-coupler U1, to the cathode of trigger diode CR10 and to the cathode of the programmable unijunction transistor Q1. The components discussed above provide the low level instantaneous trip function to cause the circuit breaker to trip upon the occurrence of the positive overcurrent while the circuit breaker contacts 48 are in the process of closing.

A mirror image of the low level instantaneous trip circuit components is provided to trip the breaker upon the occurrence of an equivalent negative overcurrent. The anodes of diodes CR4, CR5, and CR6 are connected concurrently to each other, and to resistors R4 and R8. The second side of resistor R4 is connected concurrently to capacitor C10, resistor R3, and the anode of diode CR13. The other sides of capacitor C10 and resistor R3 are grounded. The cathode of zener diode CR13 is connected to the cathode of diode of CR9, the anode of which is connected concurrently to the cathode of the light emitting diode CR19 of the the opto-coupler U2 and to the ANODE of trigger diode CR11.

The purpose of the low level instantaneous trip function is to prevent the breaker from closing into a fault greater than the breaker's close and latch rating. The low level instantaneous trip function should not trip the breaker when the breaker is already in the closed position. In the closed position the breaker must withstand a current level greater than the low level instantaneous trip level. To discriminate between a breaker closing and a breaker in the closed position, a switch 22 is connected to the positive and negative low magnetic trip circuits. Lead 24 of the switch 22 is connected to the positive low level instantaneous trip circuit between zener diode CR12 and diode CR8, and lead 26 is connected the negative circuit between diode CR9 and zener diode CR 13. The switch 22 is grounded by lead 28.

The switch 22 is controlled by a "mechanical Time Delay Mechanism" described in Ser. No. 683,092 filed Dec. 18, 1984 by A. Maulandi, assigned to the same assignee as the present invention and herein incorporated by reference. When the breaker is in the open position and during the closing of the breaker, the switch 22 is open to allow the low level instantaneous circuit to signal the breaker to trip of the occurrence of an overcurrent within the low magnetic trip range.

The signal for the positive high level instantaneous trip function is provided by a voltage divider, consisting of resistors R5 and R6 connected to the junction of diodes CR1, CR2 and CR3 as discussed above, and ground. A point between resistors R5 and R6 is connected concurrently to grounded capacitor C1 and to the anode of trigger diode CR10. The cathode of trigger diode CR10 is connected to activate the opto-coupler U1.

The negative high level instantaneous trip function is provided by a group of components that are the mirror image of those components described in the above paragraph. A voltage divider, consisting of resistors R8 and R7 provides a signal for the negative high level instantaneous trip function. Resistor R8 is connected to the juncture of diodes CR4, CR5 and CR6 while resistor R7 is grounded. The point between resistors R7 and R8 is connected concurrently to a grounded capacitor C2 and to the cathode of trigger diode CR11.

The third tripping function performed by the present invention is the time delay magnetic trip which is accomplished by the components described below. The cathode of diode CR7 is connected concurrently to capacitor C8 and resistors R12 and R13. The other side of resistor R13 is connected concurrently to resistor R14, capacitor C3 and the anode of unijunction transistor Q1. The second sides of capactors C3 and C8 and resistor R14 are grounded. The gate of programmable unijunction transistor Q1 is connected concurrently to capacitor C4 and resistor R15. The other side of resistor R15 is connected concurrently to the other side of resistor R12 and to the cathode of zener diode CR14. The other sides of capacitor C4 and the anode of zener diode CR14 are grounded. The cathode of programmable unijunction transistor Q1 activates the opto-coupler U1.

As described above, the high level instantaneous trip function and the low level instantaneous trip function detect both a positive overcurrent and a negative overcurrent since these functions are designed to trip the breaker instantaneously. The time delay magnetic trip function signals the breaker to trip upon the sustained overcurrent of a level somewhat less than the high level instantaneous trip level. Thus the time delay function is concerned with symmetrical overcurrents, not asymmetrical faults and need not detect negative overcurrents.

The opto-couplers U1 and U2 each consist of a light emitting diode (LED) CR18 and CR19, respectively, and a silicon controlled rectifier (SCR) Q3 and Q4, respectively. The LED's CR18 and CR19, activate the SCR's Q3 and Q4, respectively, by emitting light upon being energized by one of the trip functions. The cathode of SCR Q3 and the cathode of SCR Q4 are connected concurrently to each other and also to resistors R9 and R11, capacitors C5 and C6, and the gate of the silicon controlled rectifier (SCR) Q2. The gates of SCR's Q3 and Q4 are connected concurrently to each other, to capacitor C7, to the other sides of resistor R9, and to capacitor C5. The other side of capacitors C6 and C7 are connected via leads 42 and 44, respectively, to the main trip unit. When the main trip unit solenoid is activated, it sends a signal by leads 42 and 44 to activate the high magnetic trip solenoid 12 to assist in tripping the breaker.

The anodes of SCR's Q3 and Q4 are connected concurrently to each other and to resistor R10, the other side of which is connected concurrently to the anode of SCR Q2 and to the trip solenoid 12. The cathode of SCR Q2 is connected concurrently to resistor R11, and to the negative output terminals of rectifier bridges CR15, CR16, and CR17. The positive output terminal of rectifier bridges CR15, CR16 and CR17 are connected concurrently to each other and to the other end of the trip solenoid 12. One of each of the inputs of the bridge rectifiers CR15, CR16 and CR17 is connected to connection 1 of one of the current transformers and to ground. As an alternative, the bridge rectifiers may be connected to an external power supply to provide the additional voltage necessary to operate the trip solenoid 12. When the trip solenoid 12 is energized, the breaker contacts are opened.

Upon the occurrence of a positive high level overvoltage, the voltage divider consisting of resistors R5 and R6 produces a voltage across trigger diode CR10 sufficient to breakdown the trigger diode, causing it to conduct current. Capacitor C1 is a filter that prevents the trigger diode CR10 from turning ON due to noise. The current through trigger diode CR10 turns on LED CR18 which in turn activates SCRs Q3 and Q2. The trip solenoid 12 is thus energized to open the breaker contacts. Upon the occurrence of a negative high level overcurrent, the negative portion of the circuit, as described above, will similarly cause the breaker to trip.

When the circuit breaker contacts open, the mechanical time delay mechanism, disclosed in Ser. No. 683,092 identified earlier, moves the switch 22 to the open position, electrically connecting the low level instantaneous trip portion of the circuit with the remainder of the circuit.

When a low level fault occurs while the breaker is closing, zener diode CR12 will breakdown and conduct. The breakdown voltage of zener diode CR12 is less than the breakdown voltage of trigger diode CR10, causing the low level portion of the circuit to signal the breaker to trip before the high level trip function activates the opto-coupler U1. Current then flows through diode CR8 to activate LED CR18, which turns on SCR's Q3 and Q2 to send current to the trip solenoid 12, tripping the breaker. Upon the occurrence of a negative low level overcurrent while the breaker is closing, the mirror image of the circuit described above will operate in the same manner to trip the breaker.

When an overcurrent of any level occurs, current is immediately directed into the time delay portion of the circuit, through the phase conductor lines 10A, 10B and 10C, through a respective diode CR1, CR2 and CR3 to quickly charge capacitor C4. The charged capacitor C4 and the zener diode CR14 create a stable voltage across the gate and anode of the programmable unijunction transistor Q1. Capacitor C3, the timing element, also begins charging. When the voltage across capacitor C3 is greater than the relatively stable voltage across capacitor C4 by approximately 0.6 volts, the unijunction transistor Q1 begins to conduct and activates LED CR18 which operates as described above to energize the trip solenoid 12.

While the invention has been shown and described with respect to the preferred embodiment, it will be understood by those skilled in the art that variations in form, construction and arrangement may be made therein without departing from the spirit and scope of the invention. All such variations are intended to be covered in the appended claims.

We claim:

1. An electric circuit breaker for interrupting the line current flowing in an electrical power distribution circuit, said circuit breaker compising:

separable contacts, having an open position and a closed position;

trip means for separating said contacts upon the energization of said trip means;

a high level fault detection circuit connected to said trip means, said high level circuit energizing said trip means upon the occurrence of a high level fault;

a low level fault detection circuit connected to said trip means, said low level circuit energizing said trip means upon the occurrence of a low level fault; and a first switch connected to said low level circuit to deactivate said low level circuit when said contacts are in the closed position.

2. An electric circuit breaker as claimed in claim 1 additionally comprising a time delay fault detection circuit connected to said trip means, said time delay circuit energizing said trip means upon the occurrence of a continuing fault.

3. An electric circuit breaker as claimed in claim 2 wherein said time delay circuit comprises:

reference voltage means for establishing a reference voltage;

charge storage means for establishing a test voltage having a predetermined relation to the voltage across the power distribution circuit; and a third switch to energize said trip solenoid upon the test voltage exceeding the reference voltage by a predetermined voltage.

4. An electric circuit breaker as claimed in claim 1 wherein said trip means comprise a trip solenoid and a second switch connected to said trip solenoid to permit said trip solenoid to be energized only upon the occurrence of an appropriate high level fault or low level fault.

5. An electric circuit breaker as claimed in claim 4 wherein said high level circuit comprises voltage means for establishing a voltage relating to the current through said circuit breaker.

6. An electric circuit breaker as claimed in claim 4 wherein said low level circuit energizes said trip solenoid by sending a signal to said second switch.

7. An electric circuit breaker as claimed in claim 6 wherein said first switch deactivates said low level circuit by preventing the signal from being sent to said second switch.

8. An electric circuit breaker as claimed in claim 6 additionally comprising a movable contact mechanically connected to said first switch.

* * * * *